(12) United States Patent
Stievater et al.

(10) Patent No.: US 9,057,891 B2
(45) Date of Patent: Jun. 16, 2015

(54) NONLINEAR FREQUENCY CONVERSION IN NANOSLAB OPTICAL WAVEGUIDES

(71) Applicants: Todd H. Stievater, Arlington, VA (US); Jacob B. Khurgin, Pikesville, MD (US); Doewon Park, Herndon, VA (US); Marcel W. Pruessner, Silver Spring, MD (US); William S. Rabinovich, Silver Spring, MD (US); Rita Mahon, Silver Spring, MD (US)

(72) Inventors: Todd H. Stievater, Arlington, VA (US); Jacob B. Khurgin, Pikesville, MD (US); Doewon Park, Herndon, VA (US); Marcel W. Pruessner, Silver Spring, MD (US); William S. Rabinovich, Silver Spring, MD (US); Rita Mahon, Silver Spring, MD (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 240 days.

(21) Appl. No.: 13/868,056

(22) Filed: Apr. 22, 2013

(65) Prior Publication Data

US 2013/0294719 A1    Nov. 7, 2013

Related U.S. Application Data

(63) Continuation-in-part of application No. 12/901,159, filed on Oct. 8, 2010, now Pat. No. 8,427,738, which is a continuation-in-part of application No. 12/880,922, filed on Sep. 13, 2010, now abandoned.

(60) Provisional application No. 61/241,723, filed on Sep. 11, 2009.

(51) Int. Cl.
| | | |
|---|---|---|
| G02F 1/35 | (2006.01) |
| H01S 5/00 | (2006.01) |
| G02F 1/01 | (2006.01) |
| G02F 1/355 | (2006.01) |
| G02F 1/365 | (2006.01) |

(52) U.S. Cl.
CPC ............. *G02F 1/011* (2013.01); *G02F 1/355* (2013.01); *G02F 1/365* (2013.01)

(58) Field of Classification Search
None
See application file for complete search history.

(56) References Cited

U.S. PATENT DOCUMENTS

| | | | |
|---|---|---|---|
| 3,962,716 A | 6/1976 | Petroff et al. | |
| 5,434,700 A | 7/1995 | Yoo | |
| 6,940,639 B1 | 9/2005 | Belyanin et al. | |
| 7,673,517 B2 | 3/2010 | Stievater et al. | |
| 1,018,811 A1 | 8/2011 | Stievater et al. | |
| 8,427,738 B2 | 4/2013 | Stievater et al. | |
| 8,948,553 B2 * | 2/2015 | Taillaert et al. ................. 385/30 |
| 2006/0056472 A1 * | 3/2006 | Ogura ........................ 372/43.01 |
| 2007/0104443 A1 | 5/2007 | Helmy | |
| 2007/0125150 A1 | 6/2007 | Stievater et al. | |
| 2010/0139406 A1 | 6/2010 | Stievater et al. | |

(Continued)

OTHER PUBLICATIONS

Denzer, W., Hancock, W., Hutchinson, A., Munday M., Peverall R., and Ritchie, G.A.D., "Mid-infrared generation and spectroscopy with a PPLN ridge waveguide", Applied Physics B: Lasers and Optics, vol. 86, No. 3, pp. 437-441, published online Jan. 23, 2007.

(Continued)

*Primary Examiner* — Hemang Sanghavi
(74) *Attorney, Agent, or Firm* — US Naval Research Laboratory; Sally A. Ferrett

(57) ABSTRACT

A waveguide device for frequency mixing or conversion through birefringent phase matching, having a horizontal waveguide suspended above a substrate. The waveguide is formed of a zinc blend type III-V semiconductor material with a high nonlinear susceptibility.

19 Claims, 10 Drawing Sheets

(56) References Cited

U.S. PATENT DOCUMENTS

2010/0238454 A1     9/2010    Pruessner et al.
2013/0148682 A1*   6/2013    Zhang et al. ............... 372/45.01

OTHER PUBLICATIONS

De Sande J. C. G., Leo G., and Assanto G., "Phase-Matching Engineering in Birefringent AlGaAs Waveguides for Difference Frequency Generation", Journal of Lightwave Technology, vol. 20, Issue 4, pp. 651-660, (Apr. 2002).

Di Falco A., Conti C., and Assanto G., "Quadratic phase matching in slot waveguides", Optics Letters, vol. 31, Issue 21, pp. 3146-3148 (Oct. 11, 2006).

Durand O., Wyckzisk F., Olivier J., Magis M., Galtier P., De Rossi A., Calligaro M., Ortiz V., Berger V., Leo G., and Assanto G., "Contraction of aluminum oxide thin layers in optical heterostructures", Appl. Phys. Lett., vol. 83, pp. 2554-2556 (Sep. 2003).

Fiore A., Berger V., Rosencher E., Laurent N., Theilmann S., Vodjdani N., and Nagle J., "Huge birefringence in selectively oxidized GaAs/AlAs optical waveguides", Appl. Phys. Lett., vol. 68, pp. 1320-1322, (Mar. 1996).

Fiore A., Berger V., Rosencher E., Bravetti P., Laurent N., and Nagle J., "Phase-matched mid-infrared difference frequency generation in GaAs-based waveguides", Appl. Phys. Lett., vol. 71, pp. 3622-3624, (Dec. 1997).

Fiore A., Janz S., Delobel L., Van Der Meer P., Bravetti P., Berger V., Rosencher E., and Nagle J., "Second-harmonic generation at $\lambda=1.6$ μm in AlGaAs/Al2O3 waveguides using birefringence phase matching", Appl. Phys. Lett., vol. 72, pp. 2942-2945 (Jun. 1998).

Fiore A., Berger V., Rosencher E., Bravetti P. and Nagle J., "Phase matching using an isotropic nonlinear optical material", Nature, vol. 391, pp. 463-466, (Jan. 1998).

Holmstrom S. A., Stievater T. H., Pruessner M. W., Rabinovich W. S., Kanakaraju S., Calhoun L. C., Khurgin J. B., Kelly D. P., and Ghodssi R., "Spontaneous Raman Scattering in Suspended InGaAsP Waveguides," Conference on Lasers and Electro-Optics/International Quantum Electronics Conference, OSA Technical Digest (CD) (Optical Society of America, 2009), paper CThV6, Jun. 2-4, 2009, pp. 1-2.

Ishikawa, H. and Kondo, T., "Birefringent Phase Matching in Thin Rectangular High-Index-Contrast Waveguides", Applied Physics Express, vol. 2, No. 2009, pp. 042202-1-042202-3, published online Apr. 3, 2009.

Kelly D.P., Pruessner M.W., Amarnath K., Datta M., Kanakaraju S., Calhoun L.C., Ghodssi R., "Monolithic suspended optical waveguides for InP MEMS", Photonics Technology Letters, IEEE, May 2004, vol. 15, No. 5, pp. 1298-1300, May 2004.

Khurgin J.B., Pruessner M. W., Stievater T. H., and Rabinovich W. S., "Suspended AlGaAs waveguides for tunable difference frequency generation in mid-infrared", Optics Letters, vol. 33, No. 24, pp. 2904-2906, Dec. 15, 2008.

Khurgin J.B., Stievater T. H., Pruessner M. W., and Rabinovich W. S., "Design of Suspended AlGaAs waveguides for tunable difference frequency generation in mid-infrared", OSA/CLEO/IQEC, paper CFR1, p. 1-3, (Jun. 2009).

Kuo P. S., Vodopyanov K. L., Fejer M. M., Simanovskii D. M., Yu X., Harris J. S., Bliss D. and Weyburne D., "Optical parametric generation of a mid-infrared continuum in orientation-patterned GaAs", Optics Letters, vol. 31, Issue 1, pp. 71-73 (Jan. 2006).

Stievater T. H., Rabinovich W. S., Park D., Khurgin J. B., Kanakaraju S., and Richardson C. J. K., "Low-loss suspended quantum well waveguides", Optics Express, vol. 16, No. 4, pp. 2621-2627 (Feb. 11, 2008).

Stievater T. H., Park D., Rabinovich W. S., Pruessner M. W., Kanakaraju S., Richardson C. J., and Khurgin J. B., "Enhanced electro-optic phase shifts in suspended waveguides," Opt. Express, vol. 18, p. 885-892, Jan. 6, 2010.

Siviloglou G.A., Suntsov S., El-Ganainy R., Iwanow R., Stegeman G.I., Christodoulides D.N., Morandotti R., Modotto D., Locatelli A., De Angelis C., Pozzi F., Stanley C. R., and Sore M., "Enhanced third-order nonlinear effects in optical AlGaAs nanowires", Optics Express, vol. 14, Issue 20, pp. 9377-9384 (Oct. 2006).

Xu Q., Almeida V.R., Panepucci R. R., and Lipson M., "Experimental demonstration of guiding and confining light in nanometer-size low-refractive-index material", Optics Letters, vol. 29, Issue 14, pp. 1626-1628 (Jul. 15, 2004).

Yang A.H. J., Moore S.D., Schmidt B.S., Klug M., Lipson M., and Erickson D., "Optical manipulation of nanoparticles and biomolecules in sub-wavelength slot waveguides", Nature, vol. 457, pp. 71-75 (Jan. 1, 2009).

Yang S.H., Cooper M.L., Bandaru P.R., and Mookherjea S., "Giant birefringence in multi-slotted silicon nanophotonic waveguides" Optics Express, vol. 16, Issue 11, pp. 8306-8316 (May 22, 2008).

Yoo, H.G.; Fu Y.; Riley, D.; Shin, J.H.; and Fauchet, P.M.; "Birefringence and optical power confinement in horizontal multi-slot waveguides made of Si and SiO2", Optics Express, vol. 16, Issue 12, pp. 8623-8628 (Jun 9, 2008).

Yu, X.; Scaccabarozzi, L.; Harris Jr., J. S.; Kuo, P. S.; and Fejer, M. M.; "Efficient continuous wave second harmonic generation pumped at 1.55 μm in quasi-phase-matched AlGaAs waveguides" Optics Express, vol. 13, Issue 26, pp. 10742-10748 (Dec. 2005).

Kim, T. W.; Matsushita, T.; and Kondo, T.; "Phase-Matched Second-Harmonic Generation in Thin Rectangular High-Index-Contrast AlGaAs Waveguides," Appl. Phys. Express, vol. 4, pp. 082201-1-082201-14, published online Jul. 14, 2011.

Avrutsky, I.; Soref, R.; and Buchwald, W.; "Mid-infrared optical parametric oscillators based on uniform GaP waveguides," Opt. Express, vol. 18, No. 19, pp. 20370-20383, Sep. 2010.

* cited by examiner

ETCH RIDGE

NANO MACHINE THE ETCH HOLES

WET ETCH AWAY THE SACRIFICIAL GaAs

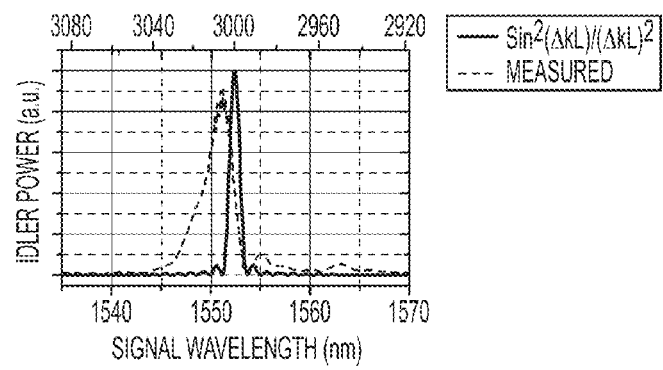
FIG. 15
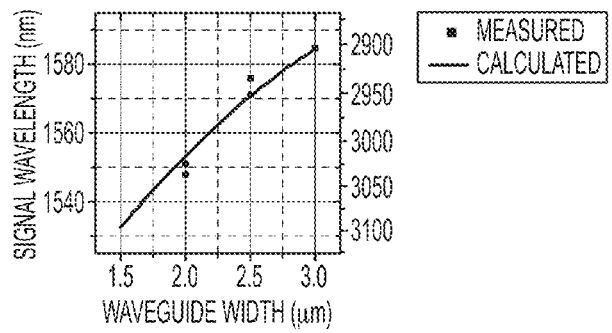
FIG. 16
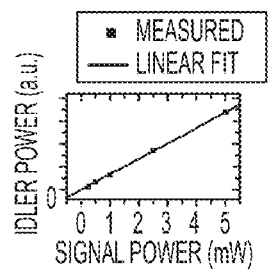 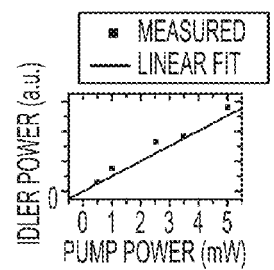
FIG. 17A            FIG. 17B

NONLINEAR FREQUENCY CONVERSION IN NANOSLAB OPTICAL WAVEGUIDES

CROSS REFERENCE TO RELATED APPLICATIONS

This application claims priority to pending U.S. patent application Ser. No. 12/901,159, filed on Oct. 8, 2010, the entire disclosure of which is incorporated herein by reference.

BACKGROUND OF THE INVENTION

1. Technical Field

The invention relates to optical waveguides in general and particularly to optical waveguides that employ materials having large nonlinear optical characteristics.

2. Related Technology

Integrated nonlinear devices have been sought for frequency conversion, particularly to generate optical radiation at wavelengths that are not readily generated by presently available laser devices, for example, in mid-IR wavelengths.

Group III-V semiconductors that crystallize in a zinc blende lattice possess a large second-order nonlinear susceptibility, in excess of 100 pm/V. This quality, and their wide use in active optoelectronic devices have made III-V materials of interest for integrated nonlinear devices for frequency conversion.

Second-order nonlinear processes require phase matching between the three waves involved. One technique for phase matching involves the optical anisotropy of nonlinear crystals, a technique usually referred to as birefringent phase matching (BPM). However, bulk zinc blende materials are optically isotropic, which makes them not useful for BPM.

An alternative technique called quasi-phase matching (QPM) has also been widely investigated. QPM involves periodically inverting the sign of the nonlinear susceptibility. QPM is well-established in ferroelectric materials, such as lithium niobate. However, QPM in III-V semiconductors such as GaAs requires complex technologies and faces severe material problems, including waveguide loss. For additional discussion, see J. B. Khurgin, M. W. Pruessner, T. H. Stievater, and W. S. Rabinovich, "Suspended AlGaAs waveguides for tunable difference frequency generation in mid-infrared", Optics Letters, Vol. 33, No. 24, pp. 2904-2906 (2008) and W. Denzer et al., "Mid-infrared generation and spectroscopy with a PPLN ridge waveguide", Applied Physics B: Lasers and Optics, Vol. 86, No. 3, pp. 437-441, 2006.

Another approach to phase-matching is to take advantage of the artificial, or "form", birefringence that can be attained in waveguides between orthogonally polarized modes. This approach may work in standard GaAs waveguides for as long as only relatively long wavelength photons (mid-IR) are involved in the process. However, the material dispersion becomes too large to be compensated by the form birefringence in applications using near-IR sources.

By the 1990s it had been found that that the relatively weak birefringence in typical $Al_xGa_{1-x}As$ waveguides, in which the cladding and core differ slightly in composition, could be greatly enhanced if layers of $Al_2O_3$ with a small refractive index are introduced between the $Al_xGa_{1-x}As$ layers via selective oxidation. Further discussion is found in A. Fiore et al., "Huge birefringence in selectively oxidized GaAs/AlAs optical waveguides", Appl. Phys. Lett., Vol. 68, pp. 1320-22, (1996) and A. Fiore et al., "Phase-matched mid-infrared difference frequency generation in GaAs-based waveguides", Appl. Phys. Lett., Vol. 71, pp. 3622-24, (1997).

A. Fiore et al., "Second-harmonic generation at $\lambda=1.6$ μm in AlGaAs/Al2O3 waveguides using birefringence phase matching", Appl. Phys. Lett., Vol. 72, pp. 2942 (1998), describes second harmonic generation using birefringence phase matching. A. Fiore et al., "Phase matching using an isotropic nonlinear optical material", Nature, Vol. 391, pp. 463-466, January 1998 describes difference frequency generation using this technique. A theoretical discussion is found in J. C. G. de Sande et al., "Phase-Matching Engineering in Birefringent AlGaAs Waveguides for Difference Frequency Generation", Journal of Lightwave Technology, Vol. 20, Issue 4, pp. 651-660, (April 2002).

This technique has several challenges. First, O. Durand et al., "Contraction of aluminum oxide thin layers in optical heterostructures", Appl. Phys. Lett., Vol. 83, pp. 2554 (2003) describes that wet oxidation of AlAs generally results in small grain poly-$Al_2O_3$ embedded in the AlAs matrix, which results in a composite $AlAs/Al_2O_3$ layer, and that the oxidation can result in a significant shrinkage of the layer thickness. In addition, A. Fiore et al., "Phase-matched mid-infrared difference frequency generation in GaAs-based waveguides", Appl. Phys. Lett., Vol. 71, pp. 3622 (1997) describes that the tunability of the device is limited to about 50 $cm^{-1}$ using temperature tuning.

BRIEF SUMMARY OF THE INVENTION

An aspect of the invention is a birefringence phase matching optical semiconductor device for generating optical pulses, the device having a substrate, a waveguide slab separated from the substrate by a space filled with a material having a lower refractive index than the waveguide slab.

The type III-V material with a large nonlinear susceptibility can be AlGaAs, GaAs, GaP, AlAs, or AlGaAsP. The substrate can be GaAs, GaSb, or InP. Support elements can be arranged between the waveguide slab and the substrate at each lateral end of the waveguide slabs. The first waveguide slab can have a longitudinal rib on the top surface of the first waveguide slab extending in the longitudinal direction. The rib has a width in a lateral direction at least as wide as its height in a vertical direction. A series of openings in the first waveguide slab and the second waveguide slab can be arranged on either side of the rib.

Another aspect of the invention is directed to a birefringence phase matching semiconductor optical device including a waveguide slab formed of a material having a high nonlinear susceptibility, the waveguide slab being supported at each end by a support element arranged at lateral ends of the waveguide slab, wherein said support elements are formed of a material having a lower refractive index, and wherein a center portion of the first waveguide slab is separated from the substrate by an air gap. The air gap can be formed by etching away a sacrificial layer beneath the waveguide slab during manufacture.

Another aspect of the invention is directed to a method for generating an output optical signal with a birefringence phase matching optical waveguide device, the optical waveguide device having a waveguide slab formed of a material having a high nonlinear susceptibility, the waveguide slab being supported at each end by a support element arranged at lateral ends of the waveguide slab, a center portion of the waveguide slab being separated from the substrate by an air gap. The method includes receiving a first optical signal at a first wavelength at an end of the waveguide slab, receiving a second optical signal at a second wavelength at the end of the waveguide slab, and optically mixing the first optical signal and the second optical signal to produce an output optical signal at a different wavelength at an opposite end of the waveguide slabs. Right here would also be a good spot to mention an OPO (just a pump to get the idler, no signal) and SHG (the pump is used twice to get the doubled frequency).

Additional features will be apparent from the drawings and following detailed description.

BRIEF DESCRIPTION OF THE DRAWINGS

FIG. 15 shows a plot of the measured idler power vs. the signal wavelength for a 2.0 μm wide waveguide, along with the calculated sin c²(ΔkL) lineshape using a phase difference (Δk) derived from the finite-element model.

FIG. 16 shows dependence of the phase-matched wavelengths on the waveguide width.

FIG. 17A is a plot of idler power versus signal power for a low-loss nanoslab waveguide device in accordance with an embodiment of the invention.

FIG. 17B is a plot of idler power versus pump power for a low-loss nanoslab waveguide device in accordance with an embodiment of the invention.

DETAILED DESCRIPTION OF EMBODIMENTS OF THE INVENTION

Devices in accordance with this invention include nanomachined type III-V semiconductor materials configured to produce low loss slotted waveguides that use form birefringence phase matching.

There are four factors that make suspended waveguides a good technique for frequency conversion. First of all, the huge difference between the TM and TE effective indices of $Al_xGa_{1-x}As$ causes giant form birefringence and greatly expands the phase-matching region practically throughout the entire IR region. Second, the tight confinement of radiation in the rib suspended air-cladding waveguides can enhance the conversion efficiency. Third, epitaxial growth provides extremely smooth horizontal surfaces, enabling low-loss propagation in slabs that are thinner than the material wavelengths without a critical dependence on smooth sidewalls. Finally, as described below, a new tuning technique can be implemented if the width of the air gap between two suspended waveguides can be varied.

Figure 1A:
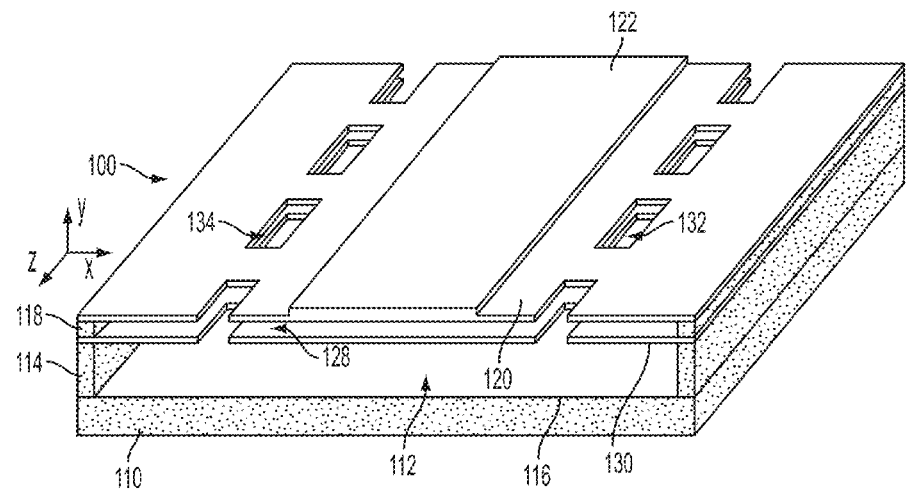
FIGS. 1A, 1B, and 1C illustrate a low-loss suspended nanoslot waveguide device in accordance with an embodiment of the invention.
Figure 1B:
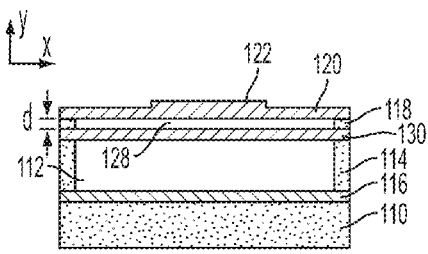
Figure 1C:
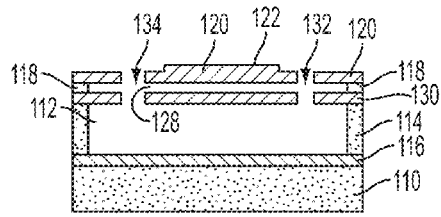

FIGS. 1A, 1B, and 1C illustrate an example of a low-loss suspended nanoslot waveguide device in an accordance with an embodiment of the invention. This integrated non-linear device is useful for frequency conversion, particularly for generating optical pulses at wavelengths that are not readily generated by presently available laser devices. Note that the figures herein are not to scale, in order to adequately show details of the devices.

The waveguide has two suspended waveguide layers or slabs 120 and 130 arranged parallel to each other and separated by an air gap 128. This air gap 128, or horizontal nanoslot, has a very small vertical dimension between the two slabs. The waveguide slabs are supported at their lateral ends by supports 118 between the waveguide slabs, and are suspended above a semiconductor substrate 110 by supports 114. The supports 114 maintain the slabs 120 and 130 at a distance from the substrate that is much larger than the vertical distance "d" between the two slabs.

A ridge 122 extends from the top waveguide slab 120 along the length of the waveguide slab 120 in the longitudinal z direction, and is intended to provide lateral confinement of the optical modes.

A series of etch holes 132, 134 in the waveguide slabs 120 and 130 extend along the longitudinal dimension. In this example, the etch holes 132, 134 are located on both lateral sides of the ridge 122. Only a few etch holes are shown in FIG. 1A for convenience.

The air gap, or nanoslot, 128 has a vertical distance between the two waveguide slabs of about 100 nm. The waveguide slab 130 that is closest to the substrate 110 has a thickness in the vertical dimension of about 130 nm. The waveguide slab 120 has a vertical thickness of about 135 nm, and the ridge 122 extends vertically above the surface of the waveguide slab 120 by about 90 nm. The ridge has a lateral width of approximately 1000 nm. The length of the waveguides along the longitudinal z direction is approximately 1 mm or longer.

The length of the waveguide slabs in the longitudinal direction should be sufficient for good beam interaction, and is typically at least about one millimeter. The length of the waveguide device will depend on the nonlinear susceptibility of the waveguide material. Materials with smaller nonlinear susceptibilities will require longer beam interaction distance, and therefore, a longer waveguide dimension.

It is preferred that the air gap distance between the bottom waveguide slab 130 and the substrate 110 should allow only a small amount, if any, of beam interaction with the substrate. A suitable distance is at least about the same as the wavelength of the incoming laser light. For example, for a 1550 nm laser, the air gap between the bottom waveguide and the semiconductor substrate should be at least about 1500 nm.

Each of the waveguide slabs 120, 130 is several times wider (in the x direction perpendicular to the waveguide slab face)

between the etch holes than it is thick (in the y-direction perpendicular to the waveguide slab face), and several times wider than the distance between the waveguide slabs. This configuration allows the TE mode to "see" an effective index closer to 1, and the TM mode to "see" an effective index of refraction closer to that of the waveguide slab material.

In this example, the waveguide slabs 120, 130 are AlGaAsP, the substrate 110 is GaAs, the supports 114 and 118 are GaAs, and the etch stop layer 116 is InGaAs(P). As will be discussed in later paragraphs, the waveguide slabs 120 and 130 can be oppositely doped, with one slab being n-doped and the other slab being p-doped, so the slabs can be electrostatically actuated by applying a voltage between the slabs. The electrostatic actuation decreases the vertical distance between the waveguide slabs.

A cross sectional view of the device 100 is shown in FIG. 1B, and a cross sectional view through the etch holes 132, 134 is shown in FIG. 1C.

A cross sectional view of the waveguide 100 through a pair of the etch holes is shown in FIG. 1C. The etch holes 132, 134 extend through both of the waveguide slabs.

FIG. 2A-2D illustrate a method for forming the waveguide 100. A sacrificial layer of GaAs is grown on the GaAs substrate, with an etch stop layer of AlGaAs between the GaAs substrate and the sacrificial GaAs layer. A slab of $Al_{0.5}Ga_{0.5}As_{0.96}P_{0.04}$ is grown on the GaAs sacrificial layer. Another sacrificial layer of GaAs is formed on the slab of $Al_{0.5}Ga_{0.5}As_{0.96}P_{0.04}$, followed by another layer of $Al_{0.5}Ga_{0.5}As_{0.96}P_{0.04}$. The epitaxial growth of the $Al_{0.5}Ga_{0.5}As_{0.96}P_{0.04}$ layers can produce extremely smooth horizontal surfaces, resulting in low loss propagation in slabs that are thinner than the material wavelengths without a critical dependence on smooth sidewalls.

One of the $Al_{0.5}Ga_{0.5}As_{0.96}P_{0.04}$ slabs can be lightly n-doped, and the other $Al_{0.5}Ga_{0.5}As_{0.96}P_{0.04}$ slab can be lightly p-doped. The sacrificial GaAs layer that forms the lateral supports 118 between the waveguide slabs are preferably not doped, so the waveguides and lateral support elements form a p-i-n diode for electrostatic actuation. Note that if electrostatic actuation is not desired, it is not necessary to n- and p-dope the waveguide slabs.

Figure 2A:
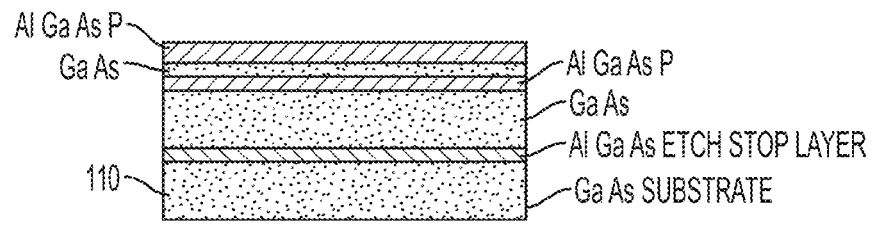
FIGS. 2A, 2B, 2C and 2D illustrate a method for forming the waveguide device of FIGS. 1A, 1B, and 1C.
Figure 2B:
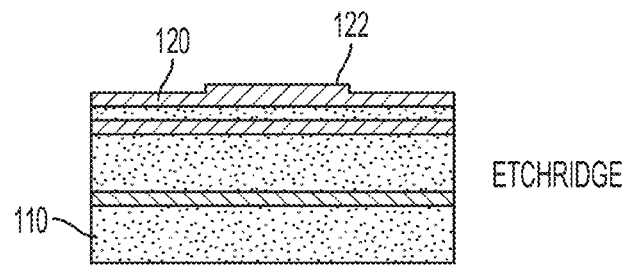

The ridge 122 can be patterned and etched in the top layer 120 of $Al_{0.5}Ga_{0.5}As_{0.96}P_{0.04}$, as seen in FIG. 2B.

Figure 2C:
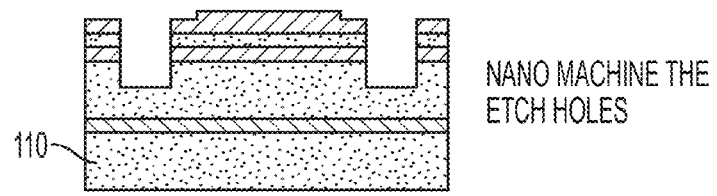

A pattern of etch holes 132 and 134 can be formed using electron beam lithography followed by a chlorine-based inductively coupled plasma (ICP) etch, as seen in FIG. 2C.

Figure 2D:
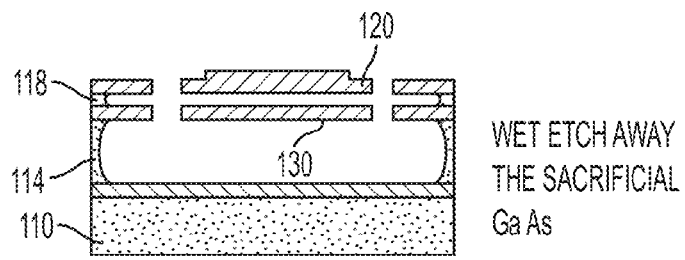

A wet etch can be used to remove the sacrificial GaAs layers, suspending the slab waveguides with a narrow horizontal nanoslot 128 between the slabs, and a larger air gap 112 between the lower of the slabs 130 and the substrate 110. The side portions of the GaAs sacrificial layer that remain after the wet etch will form supports 114 and 118 that support the lateral edges of the two AlGaAsP waveguide slabs 120 and 130, as seen in FIG. 2D.

The small amount of phosphorous in the AlGaAs waveguide slabs makes them tensile with respect to the supports and the substrate, reducing the likelihood that the suspended waveguide slabs will crack or buckle upon release from the sacrificial layer, and ensuring flatness upon release.

Referring again to FIG. 1, in operation, a signal at a first wavelength $\lambda_1$ and a second signal at a second wavelength $\lambda_2$ are incident at one longitudinal end of the waveguide 100. A third optical pulse at a third wavelength $\lambda_3$ is generated in the waveguide device 100, and travels along the longitudinal direction of the waveguides toward the opposite longitudinal end of the device. The third wavelength $\lambda_3$ signal is emitted from the longitudinal end of the device.

Figure 3A:
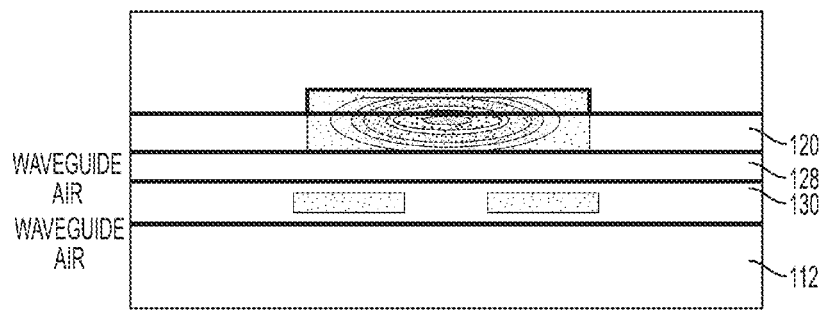
FIG. 3A-3C illustrate the power density distributions of three modes involved in difference frequency generation.
Figure 3B:
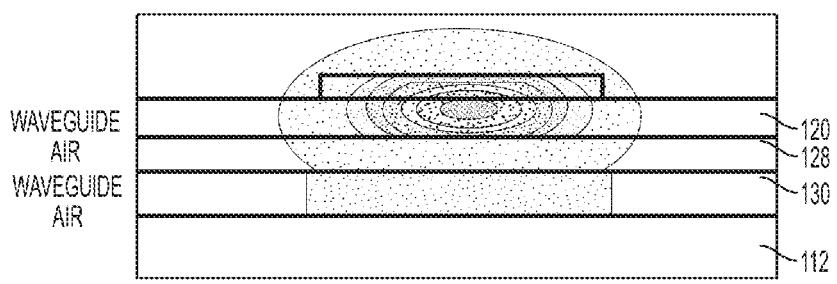
Figure 3C:
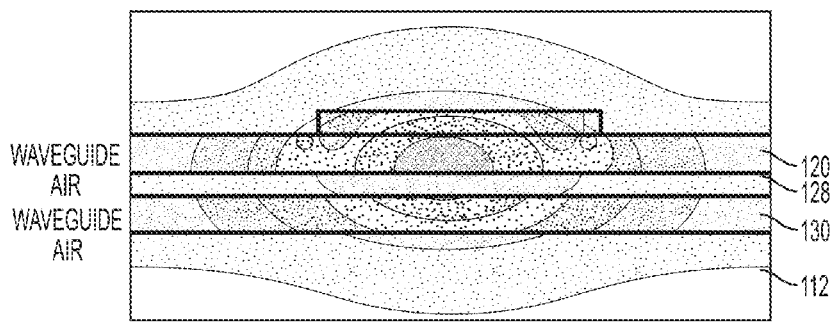

FIG. 3A-3C illustrate the power density distributions of three modes involved in difference frequency generation, as calculated with a Comsol Multiphysics finite element mode solver. FIG. 3A shows the $TM_{00}$ mode at the shorter pump wavelength of 1060 nm, and FIG. 3B shows the $TE_{00}$ mode at the longer pump wavelength of 1554 nm. FIG. 3C shows the $TE_{00}$ mode at the difference frequency mid-IR wavelength of 3410 nm. The $TM_{00}$ mode of the shortest wavelength pump $P_1$ of $\lambda_1$=1060 nm shown in FIG. 3A appears to be significantly wider than the $TE_{00}$ mode of the longer wavelength pump $P_2$ of $\lambda_2$=1554 nm shown in FIG. 3B, but both of these modes are largely confined in the top waveguide under the ridge.

The horizontal nanoslot 128 between the slabs 120, 130 allows some fields to propagate mostly in the higher index AlGaAsP material, while other modes propagate more in the lower refractive index air. For example, the TM mode penetrates the air gap much more than the TE mode, and therefore, the TM mode is less confined than a TE mode and the device is expected to have a substantially lower effective index for the TM modes. As seen in FIG. 3C, the $TE_{00}$ mode of the difference frequency mid-IR wave $\lambda_3$=3410 nm is spread out between two waveguides and is expected to be greatly affected by any changes in the air gap width.

Figure 4:
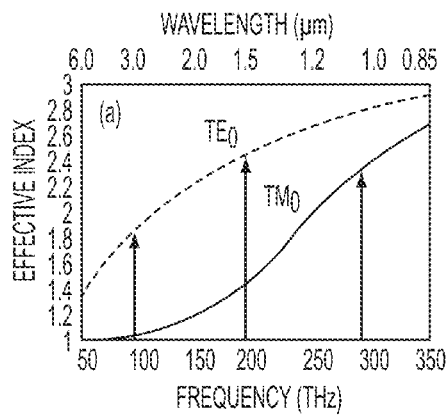
FIG. 4 is a plot of the effective index $n_{eff}$ over a frequency range of 50 THz to 350 THz (wavelength range of 6.0 to 0.85 microns).
Figure 5:
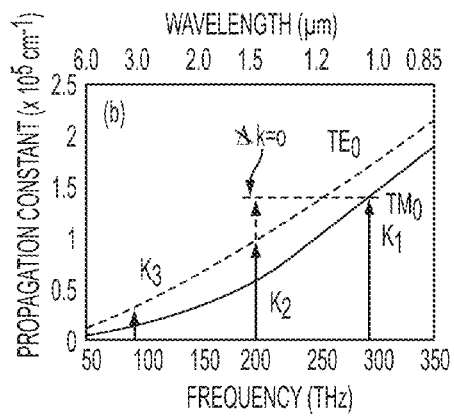
FIG. 5 is a plot of the propagation constant β over a frequency range of 50 THz to 350 THz.

To illustrate the extent of the form birefringence attainable in the suspended waveguide, FIG. 4 plots the refractive effective index $n_{eff}$ and FIG. 5 plots the propagation constant $\beta$ for the frequency range spanning most of the near- and mid-IR from 0.85 to 6 microns.

As seen in FIG. 4, a large birefringence $\Delta n$ of about one (1.0) can be achieved at a pump wavelength of approximately 1.5 microns. The one micron pump wavelength is very useful, as it allows pumping by solid state lasers, such as, for example, Nd-YAG lasers The large $\Delta n$=1 birefringence of the waveguide 100 is estimated to be at least five times as large as the birefringence of waveguides that use oxidized waveguides described in A. Fiore et al., "Second-harmonic generation at $\lambda$=1.6 μm in AlGaAs/Al2O3 waveguides using birefringence phase matching", Appl. Phys. Lett., Vol. 72, pp. 2942-45 (1998) and A. Fiore et al., "Phase-matched mid-infrared difference frequency generation in GaAs-based waveguides", Appl. Phys. Lett., Vol. 71, pp. 3622-24, (1997), although the waveguide 100 uses a single pair of AlGaAsP slabs with one air gap layer between them, whereas the referenced layered oxidized waveguides use three aluminum oxide layers.

FIG. 5 plots the propagation constant $\beta$ versus frequency and wavelength of the two pump waves and one DFG wave, and shows that the phase matching condition $k_1$=$k_2$+$k_3$ can be satisfied.

The conversion efficiency (per unit of length) is $$\eta_{DFG} = \frac{8\pi^2 \eta_0 |d_{eff}|^2}{n_1 n_2 n_3 \lambda_3^2 A_{ff}},$$

where $d_{eff}$=170 pm/V is the second order susceptibility $\chi^2$, $\eta_0$=377Ω, the values $n_i$ are the effective indices of three modes i=1, 2, 3, and the effective DFG cross section is determined by the modes' E(x, y) overlap as $$A_{eff} = \frac{\int nE_1^2 dx dy \int nE_2^2 dx dy \int nE_3^2 dx dy}{n_3 [\int n E_1 E_2 E_3 dx dy]^2},$$

with the integral in the denominator being taken only inside the waveguides.

According to these equations, the effective DFG cross section $A_{eff}$ is approximately 4 square microns (4 μm²), and a conversion efficiency $\eta_{DFG}$ of about 400 W⁻¹ cm⁻² can be obtained, which is much higher than the layered oxide waveguides. The higher conversion efficiency is believed to be due to the much tighter mode confinement of the FIG. 1 nanoslot waveguide. It appears that full conversion is possible within an approximately one mm long waveguide with less than one Watt of input power without being impeded by excessive two-photon absorption, which at these levels would result in an estimated 0.1 cm⁻¹ loss.

In a preferred embodiment, the system can be tuned by varying the air gap distance d between the two waveguides. The width of the air gap mostly affects the mid-IR mode $\lambda_3$ and, to a lesser degree, the relatively long $\lambda_2$ mode, while the short wavelength pump in the TE mode is hardly affected. As a result, the phase-matching condition can be tuned.

Figure 6:
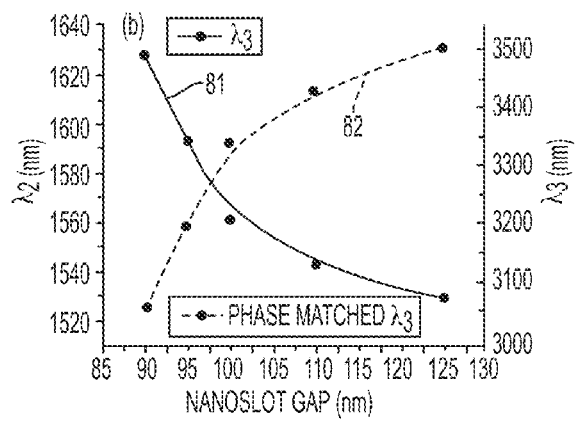
FIG. 6 plots the phase pump wavelength $\lambda_2$ and the phase matched DFG wavelength $\lambda_3$ versus nanoslot gap distance for a nanoslot waveguide device with a constant pump wavelength $\lambda_1$ of 1.06 nm.

FIG. 6 illustrates operation of a nanoslot waveguide with a constant pump wavelength $\lambda_1$ of 1.06 nm. The curve 81 shows the second pump wavelength $\lambda_2$ that would result in an output DFG wavelength $\lambda_3$ (curve 82) when the nanoslot is at a particular gap distance. For example, when the nanoslot gap is 95 nm, a phase matched pump wavelength $\lambda_2$ of about 1590 nm is expected to produce a DFG wavelength $\lambda_3$ of about 3210 nm. When the nanoslot gap is about 110 nm, a phase matched pump wavelength $\lambda_2$ of about 1540 nm will produce a DFG wavelength $\lambda_3$ of about 3440 nm.

Figure 7:
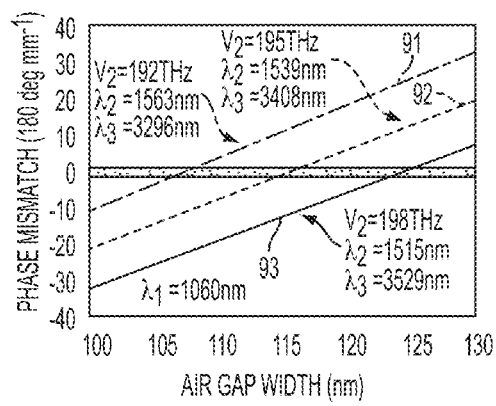
FIG. 7 shows plots of the phase mismatch versus air gap width for different wavelengths $\lambda_2$ and a constant wavelength $\lambda_1$ of 1060 nm.

FIG. 7 illustrates phase matching curves 91, 92, and 93 as plots of the phase mismatch versus air gap width for different wavelengths $\lambda_2$ and a constant wavelength $\lambda_1$ of 1060 nm. The horizontal lines indicate the phase matching range for a one millimeter long waveguide. By varying the gap width between 100 and 130 nm, tunability in excess of 10 THz (330 cm⁻¹) can be achieved, which can cover the DFG wavelength ($\lambda_3$) range from 3.2 to 3.6 microns.

Figure 8:
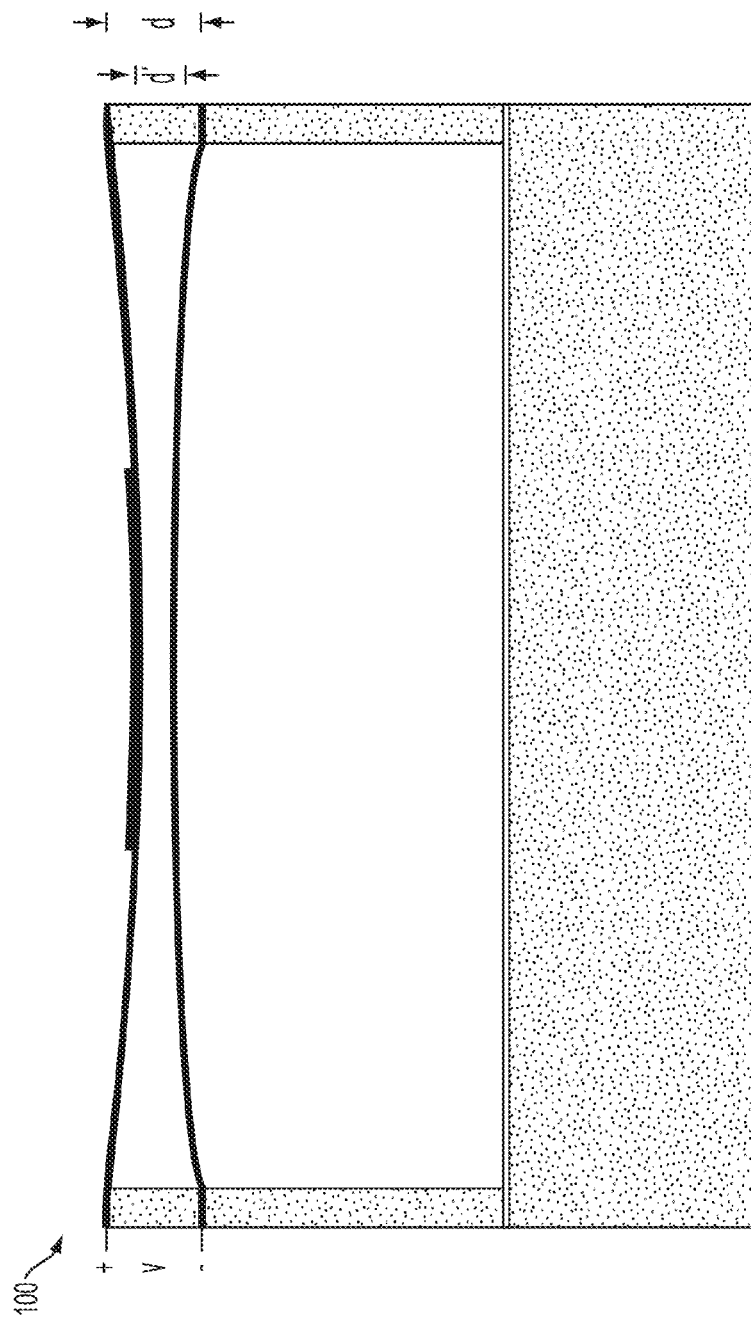
FIG. 8 shows electrostatic actuation of the n- and p-doped waveguide slabs.

Tuning of the gap width can be achieved using electrostatic actuation of suspended air-clad waveguides. One way to electrostatically actuate the waveguides is to lightly p-dope the bottom slab, leave the GaAs sacrificial layer undoped, and lightly n-dope the top slab. As shown in FIG. 8, during operation, applying a reverse bias of a few volts across the resulting p-i-n diode formed by the doped slabs, can cause change of up to one third of the original gap distance. Low doping concentrations should not add additional propagation loss to the waveguide.

The examples shown above illustrate AlGaAsP waveguide slabs and a GaAs substrate. The device can also be formed with other III-V semiconductor materials with large second order nonlinear susceptibilities ($\chi^2$). For example, InGaAs, InGaAsP, InAlAs, InP, AlAs, or AlGaAsP can form the waveguides and GaP, InP, GaSb, or GaAs can form the substrates. Silicon and germanium are not suitable, since they have no nonlinear susceptibility ($\chi^2$)

In operation, the optical waveguide device is a frequency mixer, difference frequency generator (DFG), sum frequency generator (SFG), or second harmonic generator (SHG), and can be very useful in the mid-IR range. The device can be incorporated as part of a laser system, or external to a laser source.

The waveguide devices described herein can be arranged as part of a laser device or external to a laser device. The waveguide device can be arranged within an optically resonant cavity, as part of an optical parametric oscillation system. The waveguide device stimulates emission of photons at the difference frequency generation wavelength, which are amplified by the resonant cavity.

Figure 9A:
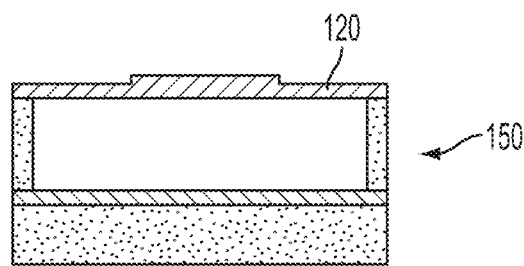
FIGS. 9A and 9B illustrate a low-loss suspended waveguide device with a single suspended waveguide.
Figure 9B:
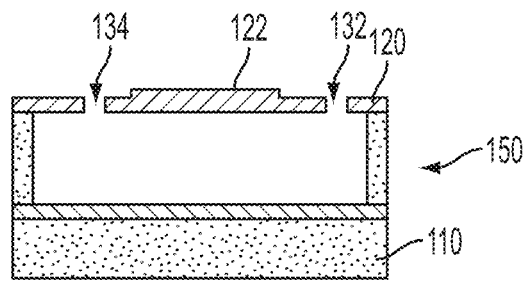

The waveguide device can also be configured with some variations. For example, a waveguide device in accordance with an embodiment of the invention shown in FIGS. 9A and 9B a waveguide slab 120 suspended over the substrate 110 without the bottom waveguide slab 130 of FIG. 1A-1C. The top waveguide slab 120 includes etch holes 132 and 134, and a ridge 122 as shown in FIG. 1A above, or a rib with more height than the ridge 122. Such a one-waveguide configuration would not be tunable over different frequency ranges but would still enable birefringent phase matching with efficiencies similar to the suspended nanoslot waveguide of FIG. 1A-1C.

The waveguides shown herein are shown as extending across the lateral direction to the support elements. It is also suitable to include the high nonlinear susceptibility material (e.g., the AlGaAsP) across only the center portion of the waveguide slabs, with a different material between the lateral supports and the high nonlinear susceptibility material.

The waveguide can also be configured with more than two waveguide slabs, with horizontal nanoslots between each pair of slabs.

The suspended slotted waveguide device combines microelectromechanical actuation, semiconductor nanofabrication, and birefringent phase matching to achieve high conversion efficiencies over a large optical bandwidth.

The suspended nanoslot and nanoslab waveguide devices described herein can have several advantages over QPM approaches or other BPM devices with nonlinear wavelength conversion.

For example, QPM waveguides appear to be inherently lossier than waveguides based on birefringent phase matching in III-V semiconductor waveguides. The QPM approaches involve the periodic domain reversal of the crystal along the length of the waveguide. Thus, the numerous interfaces spaced at every few tens of microns along the QPM waveguide should be perfectly smooth and free of dislocations to minimize scattering and waveguide loss. In contrast, the birefringent nanoslot and nanoslab devices described herein have uniform geometries along their entire lengths along the longitudinal direction, and do not require the domain reversals of the QPM waveguides.

In addition, most current QPM approaches are based on the ferroelectric oxides (e.g., lithium niobate). Lithium niobate is only transparent in a range from the visible to about 4 microns, whereas AlGaAs or GaAs is transparent over a range from the visible to over 15 microns.

The suspended rib waveguide devices are easier to manufacture with precise control over the slab thickness, have very smooth slab surfaces, and have a large index contrast for strong mode confinement.

High conversion efficiency is predicted based on two factors. First, the modal $A_{eff}$ can be made very small (e.g., a few square microns), which is at least an order of magnitude smaller than the effective area of PPLN or OP—GaAs waveguides. The nonlinear conversion efficiency is inversely proportional to the $A_{eff}$. Second, GaAs/AlGaAs has an approximately ten times larger nonlinear susceptibility than LiNbO3 used in a PPLN device.

It is also noted that the tunability provided by the electrostatic actuation of the suspended waveguides is very beneficial for applications that require wavelength agility, such as spectroscopy and molecular sensing. Alternative approaches that use QPM or a single slab/ridge waveguides are only tunable with temperature, which is fundamentally more limited in tuning range.

Figure 10A:
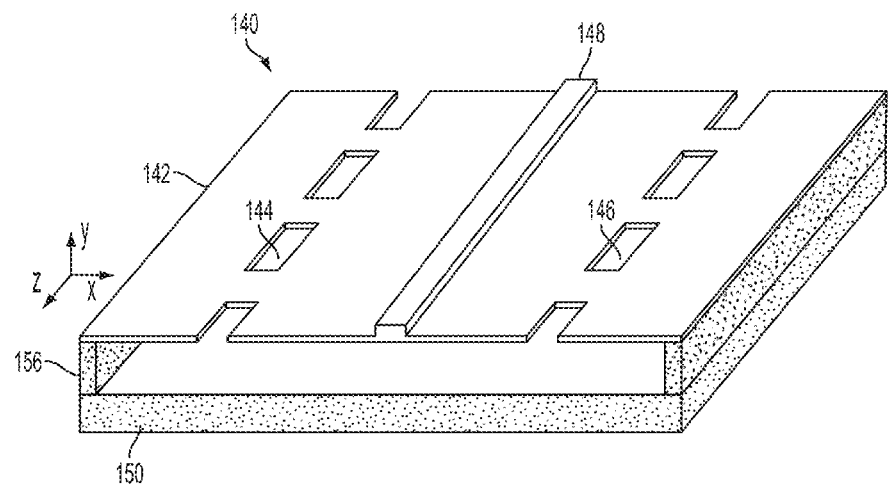
FIG. 10A-10C illustrate a low-loss nanoslab waveguide device with a single suspended waveguide.
Figure 10B:
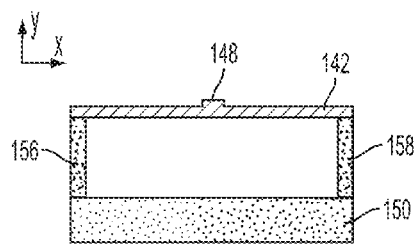
Figure 10C:
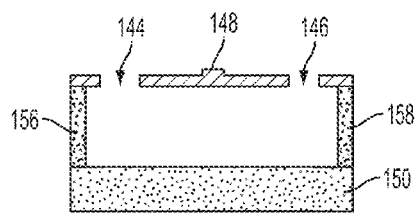
Figure 11A:
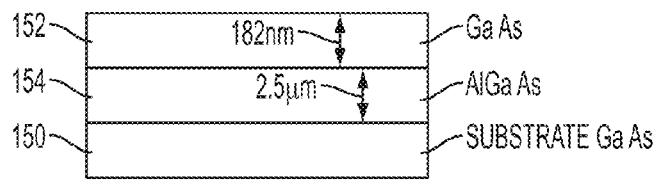
FIG. 11A-11D illustrate a method for forming the low-loss nanoslab waveguide device with a single suspended waveguide of FIG. 10A-10C.
Figure 11B:
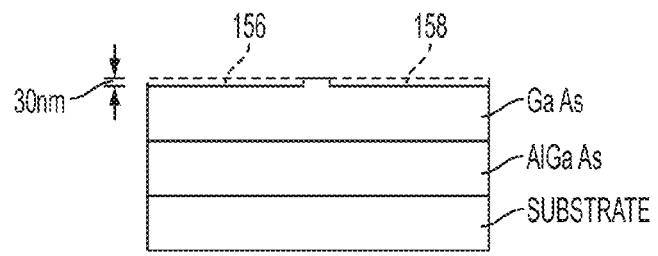
Figure 11C:
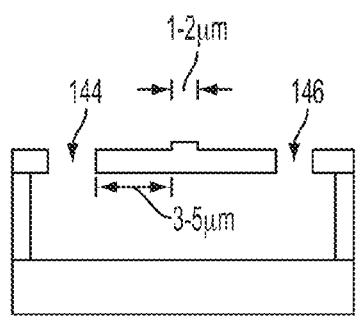
Figure 11D:
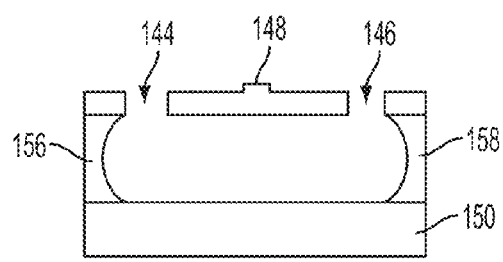

FIG. 10A-10C illustrate a waveguide device 140 having a single waveguide slab 142 suspended over the substrate 150. The waveguide slab 142 includes etched holes 144, 146 through the slab, and a ridge 148 or rib on the surface of the slab that faces away from the substrate.

The waveguide slab 142 can be formed of GaAs, or alternatively can be formed of any of the zinc blende III-V semiconductor material family with large second order nonlinear susceptibilities ($\chi^2$), for example, GaP, AlGaAs, InP, InGaAs, InGaAsP, InAlAs, InP, AlAs, or AlGaAsP).

Air or another material with a lower refractive index than the semiconductor slab surrounds the waveguide slab. Examples of suitable cladding material include air or another gas, liquids, and solid oxides including but not limited to SiO2 or Al2O3 (amorphous sapphire), other solids such as glass (SiO2), or silicon nitride (SiN or Si3N4). It is also suitable that different materials be located above and/or below the waveguide slab. For example, a lower index of refraction solid material can located between the waveguide slab and the substrate and air located above the waveguide slab. This cladding can be any material with a refractive index lower than the semiconductor core.

A large difference in the index of refraction between the nanoslab waveguide and the surrounding cladding is desired, in order to produce a large degree of birefringence. Thus, a GaAs nanoslab waveguide with an index of refraction n of about 3.4, when surrounded by air in a suspended nanoslab configuration shown in FIG. 10A-10C, has extremely high birefringence.

The waveguide device can be manufactured as shown in FIG. 11A-11D. The GaAs waveguiding layer 152 is grown on a 2.5 μm-thick sacrificial $Al_{0.65}$ $Ga_{0.35}As$ layer 154 via molecular-beam epitaxy. In this example, the substrate is GaAs. The sacrificial AlGaAs layer preferably has a high aluminum content, for example, at least 40% or 50% Al.

Waveguides with widths from 1 to 3 μm are then defined by etching ribs 156, 158 at a depth of 30-nm into the GaAs layer 152. A series of holes 144, 146 spaced 3 to 5 μm from the edge of the waveguide are then etched through the GaAs layer 152 into the AlGaAs layer 154. The sacrificial layer 154 is removed with a selective HF:H2O wet etch, leaving support posts 156, 158 under the lateral edges of the waveguide layer, and the samples are then dried in a critical point dryer.

The thickness and width of the waveguide rib are chosen based on the desired optical properties of the waveguide. Generally, the waveguides will be thinner than the wavelengths of operation (in the y direction shown in FIG. 10A), with the thickness being selected based on satisfying the phase matching condition for a desired input wavelength or wavelengths.

A narrower waveguide (in the lateral, or x direction shown in FIG. 10A) will support fewer modes than a wider waveguide. However, narrowing the waveguide also can make the waveguide "lossier". Accordingly, if single mode operation is desired, the waveguide width can be selected to support only one or a few modes, with an acceptable level of loss. For multimode operation, a somewhat wider waveguide is chosen.

Figure 12:
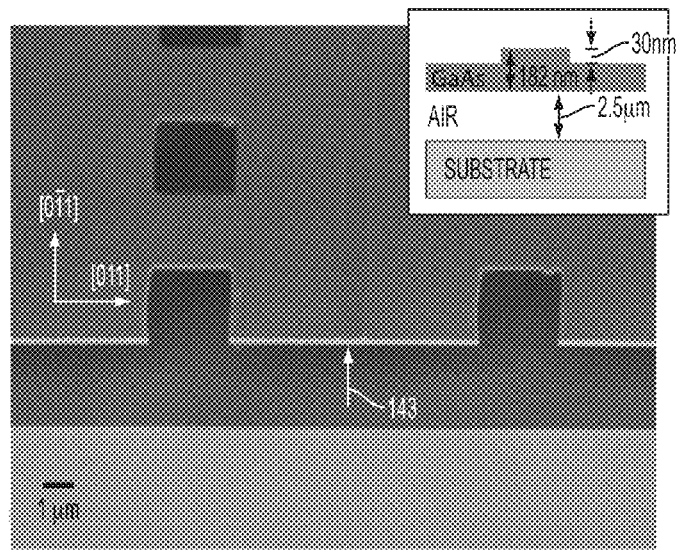
FIG. 12 is a scanning electron microscope image of a low-loss nanoslab waveguide device in accordance with an embodiment of the invention.

An SEM image of a released 1-μm-wide waveguide is shown in FIG. 12, with the [01bar1] and [011] directions shown. Waveguides oriented in the <011> directions permit phase-matching for nonlinear frequency conversion due to the large birefringence inherent in the high-contrast ratio and thin slab.

In this example, a slab thickness of 182 nm was chosen for difference frequency generation using a $TM_{00}$ pump at 1025 nm and a $TE_{00}$ signal at 1550 nm to generate a $TE_{00}$ idler at 3025 nm. The pump and signal optical energies are focused onto the facets of the waveguides with a length (L) of 1.2 mm (along the longitudinal or z direction of FIG. 10A) using a lensed optical fiber. Here, the signal and pump optical energies are directed onto the waveguide facet, e.g., onto the same endface of the waveguide slab, at the location 143 shown in FIG. 12. The waveguide device optically mixes the signal and pump optical energies to produce an output optical signal, e.g., the "idler" optical energy, at a different wavelength, at the opposite end of the waveguide slab.

In this example, the pump energy is TM polarized, and the signal and idler energies are both TE polarized. Note that optical energies described here as having "TE" or "TM" polarization can also include some components that are orthogonally polarized (e.g., they are "quasi-TE" and "quasi-TM").

In this example, the output signal is collected with a reflective objective, long-pass filtered, then detected with a cooled InSb photodiode.

Figure 13:
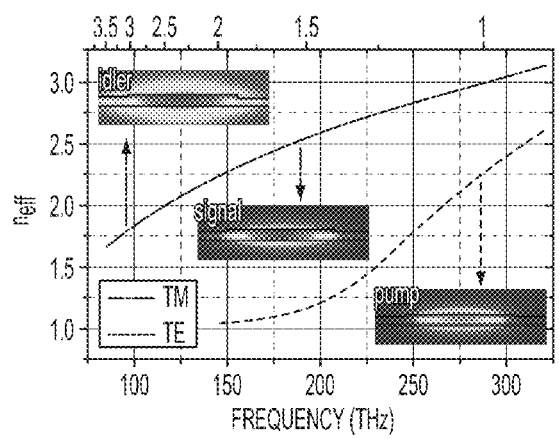
FIG. 13 illustrates the effective index dispersion of the $TE_{00}$ and $TM_{00}$ modes of the waveguide, along with the electric field distributions at the phase matched wavelengths.

FIG. 13 illustrates the effective index dispersion of the $TE_{00}$ and $TM_{00}$ modes of the waveguide, along with the electric field distributions at the phase matched wavelengths. For these wavelengths and a waveguide width of 2 μm, the effective indices of the pump, signal, and idler are found from finite-element modal simulations to be, respectively, $n_p$=2.28, $n_s$=2.53, and $n_i$=1.79.

Figure 14:
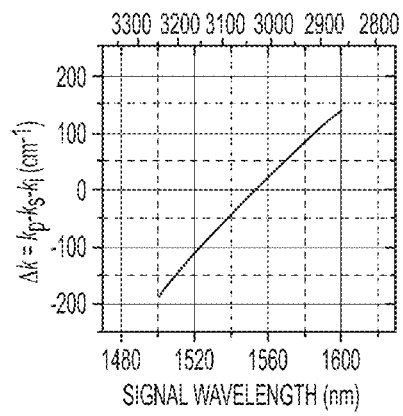
FIG. 14 is a plot of the calculated phase difference for a 182 nm thick GaAs slab and a 1025 nm wavelength pump, versus signal wavelength and idler wavelength.

FIG. 14 is a plot of the calculated phase difference, for a 182 nm thick GaAs slab for a 1025 nm wavelength pump, versus signal wavelength and idler wavelength. Note that the phase matching condition ($\Delta k = k_p - k_s - k_i = 0$) is satisfied at the point where the curve intersects the $\Delta k = 0$ axis, so the phase matching condition is satisfied for the signal wavelength $\lambda_s$=1552 nm.

Each possible waveguide thickness will have a different curve of calculated phase difference, so the waveguide thickness is selected to satisfy the phase matching condition for the desired signal and pump wavelengths. In the example of FIG. 10A-10C, the 182 nm thickness of the nanoslab waveguide supports a 1.03 micron pump and a 1.55 micron signal, and the waveguide produces a 3.03 micron idler.

FIG. 15 shows a plot of the measured idler power vs. the signal wavelength for a 2.0 μm wide waveguide, along with the calculated $\sin c^2(\Delta kL)$ lineshape using a phase difference ($\Delta k$) derived from our finite-element model. FIG. 16 shows dependence of the phase-matched wavelengths on the waveguide width.

FIGS. 17A and 17B show the expected linear relationship between both the signal and pump power (measured prior to coupling into the waveguide) and the measured idler power. The agreement between the measurements and calculations is excellent.

Due to the small mode size and strong modal overlap in these waveguides, the difference frequency generation (DFG) efficiency is expected to be extremely high, for example, about $\eta \approx 0.07$ $P_p L^2$ where η is the signal-to-idler conversion efficiency, $P_p$ is the pump power (in mW) and L is the waveguide length (in centimeters). Preliminary estimates of our conversion efficiency are approximately $3 \times 10^{-5}$ for a 2.5 mW incident pump.

Mode mismatch and facet reflectivity imply an input pump coupling of approximately 13 dB, placing the measured conversion efficiency only a factor of five below the predicted value. At least part of this discrepancy likely arises from nonzero propagation losses in the waveguides.

Nevertheless, near complete conversion is achievable in waveguides just a few millimeters long with only tens of milliwatts of CW pump power. Such efficient conversion

What is claimed as new and desired to be protected by Letters Patent of the United States is:

1. A birefringent phase matching optical semiconductor device for frequency mixing or conversion comprising:
a nanoslab waveguide formed of a zinc blende type III-V semiconductor material and having an index of refraction higher than surrounding cladding, the nanoslab waveguide having a thickness, in a direction perpendicular to a face of the nanoslab waveguide, less than the vacuum wavelength of an input optical radiation.

2. The birefringent phase matching optical semiconductor device according to claim 1, wherein the surrounding cladding on at least one face of the nanoslab waveguide is air.

3. The birefringent phase matching optical semiconductor device according to claim 1, wherein the surrounding cladding on both faces of the nanoslab waveguide is air.

4. The birefringent phase matching optical semiconductor device according to claim 1, wherein the surrounding cladding material is a glass, a solid oxide, SiO2, Al2O3, or silicon nitride, a liquid, a gas or another material with a refractive index lower than the semiconductor material of the nanoslab waveguide.

5. The birefringent phase matching optical semiconductor device according to claim 1, the nanoslab waveguide has a width in a direction parallel to a face of the nanoslab waveguide, wherein said thickness is less than said width.

6. The device according to claim 1, further comprising a substrate, wherein an air gap is located between parallel faces of the nanoslab waveguide and the substrate.

7. The device according to claim 1, wherein the nanoslab waveguide material comprises GaAs.

8. The device according to claim 1, further comprising:
a substrate; and
support elements arranged between the nanoslab waveguide and the substrate at each lateral end of the nanoslab waveguide.

9. The device according to claim 8, wherein the support elements comprise AlGaAs having at least 45% aluminum, the substrate comprises GaAs, and wherein the support elements are formed by etching away a portion of a sacrificial layer between the nanoslab waveguide and the substrate.

10. The device according to claim 1, wherein the nanoslab waveguide includes a protrusion at a top surface of the nanoslab waveguide extending in the longitudinal direction.

11. The device according to claim 10, wherein the protrusion has a width in a lateral direction at least as wide as its height in a vertical direction.

12. The device according to claim 1, wherein the nanoslab waveguide includes at least one opening extending through the nanoslab waveguide for etching solution.

13. The device according to claim 12, wherein the nanoslab waveguide includes a plurality of openings through the waveguide at both lateral sides of the protrusion.

14. A birefringent phase matching optical semiconductor device for receiving at least one optical signal at a first wavelength and generating a second optical signal at a second wavelength, the device comprising:
a nanoslab waveguide formed of a type III-V semiconductor material, the nanoslab waveguide having a thickness less than its length and less than its width; and
the nanoslab waveguide being supported at each end by a support element arranged at lateral ends of the nanoslab waveguide, wherein said support elements are formed of a material having a lower refractive index compared to the nanoslab waveguide material.

15. A method for generating an output optical signal with a birefringent phase matched frequency conversion optical waveguide device, the optical waveguide device having a nanoslab waveguide formed of a material having a high nonlinear susceptibility, the nanoslab waveguide having a smaller thickness dimension than width dimension, wherein at least one material having a lower refractive index than the nanoslab waveguide surrounds both faces of the nanoslab waveguide, the method comprising:
receiving a first optical signal at a first wavelength at an end of the nano slab waveguide;
receiving a second optical signal at a second wavelength at the end of the nano slab waveguide;
optically mixing the first optical signal and the second optical signal to produce an output optical signal at a different wavelength at an opposite end of the nano slab waveguide.

16. The method according to claim 15, wherein the first optical signal is TM polarized, and the second optical signal and the output optical signal are TE polarized.

17. The method according to claim 15, wherein the material having a lower refractive index than the nanoslab waveguide is air.

18. The method according to claim 15, wherein the first optical signal and the second optical signals are generated by lasers.

19. A method for generating an output optical signal with a birefringent phase matched frequency conversion optical parametric oscillator waveguide device, the device having a nanoslab waveguide formed of a material having a high nonlinear susceptibility, the nanoslab waveguide having a smaller thickness dimension than width dimension, wherein at least one material having a lower refractive index than the nanoslab waveguide surrounds both faces of the nanoslab waveguide, the method comprising:
receiving an optical signal at a first wavelength at an end of the nanoslab waveguide;
generating, via second order nonlinear optical interaction, an output optical signal at a different wavelength at an opposite end of the nanoslab waveguide.

* * * * *